(12) United States Patent
Tesler (10) Patent No.: US 7,953,320 B2
(45) Date of Patent: May 31, 2011

(54) SYSTEMS AND METHODS FOR DETERMINING AN AC/DC CROSS-CALIBRATION COEFFICIENT

(75) Inventor: Alexander Tesler, Palo Alto, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 690 days.

(21) Appl. No.: 12/052,502

(22) Filed: Mar. 20, 2008

(65) Prior Publication Data

US 2009/0238560 A1 Sep. 24, 2009

(51) Int. Cl.
*H04B 10/08* (2006.01)
(52) U.S. Cl. ............... 398/25; 398/16; 398/38
(58) Field of Classification Search ............ 398/16, 398/25, 38, 94
See application file for complete search history.

(56) References Cited

U.S. PATENT DOCUMENTS

| | | | |
|---|---|---|---|
| 7,403,728 B2* | 7/2008 | Fletcher et al. | 399/50 |
| 7,466,118 B2* | 12/2008 | Bjorn | 324/74 |
| 2003/0042884 A1* | 3/2003 | Kingsley et al. | 324/96 |
| 2003/0160806 A1* | 8/2003 | Lee et al. | 345/698 |
| 2008/0164864 A1* | 7/2008 | Bjorn | 324/96 |
| 2008/0240218 A1* | 10/2008 | Sumesaglam | 375/229 |

* cited by examiner

*Primary Examiner* — Dzung D Tran (57) ABSTRACT

A first signal shaper generates a first signal having a first asymmetry. A second signal shaper generates a second signal having a second asymmetry different from the first asymmetry. The first and second signals have approximately the same peak-to-peak amplitude. An AC measurement element acquires a first scaled representation of the shape of the first signal and a second scaled representation of the shape of the second signal. A DC measurement element receives the first signal and the second signal and generates a first value responsive to the first signal and a second value responsive to the second signal. A processor calculates a first factor responsive to the shape of the first signal and a second factor responsive to the shape of the second signal. The processor applies the first and second factors and the first and second values in a function that generates the AC/DC cross-calibration coefficient.

18 Claims, 5 Drawing Sheets

SYSTEMS AND METHODS FOR DETERMINING AN AC/DC CROSS-CALIBRATION COEFFICIENT

BACKGROUND

Optical transmission systems generally use on/off switching or keying to generate a series of pulses. The presence of light from a light source commonly indicates a first state (e.g., a "1") and the absence of light indicates a second state (e.g., a "0". As a light source, the semiconductor laser has distinct advantages over light-emitting diodes or other sources. The semiconductor laser can support higher data rates and can reach longer distances when the emitted light is transmitted via a glass fiber. Due to the physics of the turn on transition, namely wavelength shift and wavelength distortion that result from modulating the laser through the lasing threshold, direct modulation is problematic. One way of minimizing the problems introduced by modulating a laser through the lasing threshold is to bias the laser source such that the OFF state is not completely off. While biasing the laser source avoids the performance degradation (wavelength shift, waveform distortion) that results from modulating the laser through the lasing threshold, introducing the bias creates difficulties in generating precise calibration signals to measure performance parameters of the optical transmitter.

A key indicator of the performance of an optical-fiber-based communications system is the extinction ratio. The extinction ratio describes the efficiency with which the transmitted optical power is modulated over the fiber-optic transport. The extinction ratio is the relationship of the power used in transmitting a logic level "1" (or P1) to the power used in transmitting a logic level "0" (or P0). The extinction ratio can be defined as a linear ratio, P1/P0; as a power measurement, 10× log(P1/P0); or as a percentage, (P0/P1)×100.

A measurement system for determining the extinction ratio of an optical transmitter under test typically consists of a digital storage oscilloscope or wideband digital-sampling oscilloscope and an optical to electrical converter. In practice, an accurate determination of extinction ratio is difficult to make. The response characteristics of the oscilloscope or other test equipment used when measuring signal components received from an optical to electrical signal converter are generally confirmed with a high-precision calibration signal. These prior art calibration methods supply a calibration signal with known DC (direct current) and AC (alternating current) values or a known relation between the DC and AC components of the calibration signal to the common input of DC and AC measuring devices. Such a calibration signal can be defined by frequency or the period, the peak-to-peak amplitude, the DC offset and an average value. A DC offset is that portion or component of the signal that is shifted or offset in amplitude from a reference value and does not vary with time. A DC measuring device provides a representation of the average amplitude of the signal. An AC measuring device may provide one or both of the frequency and a scale representation of the peak-to-peak amplitude of the signal.

Figure 1:
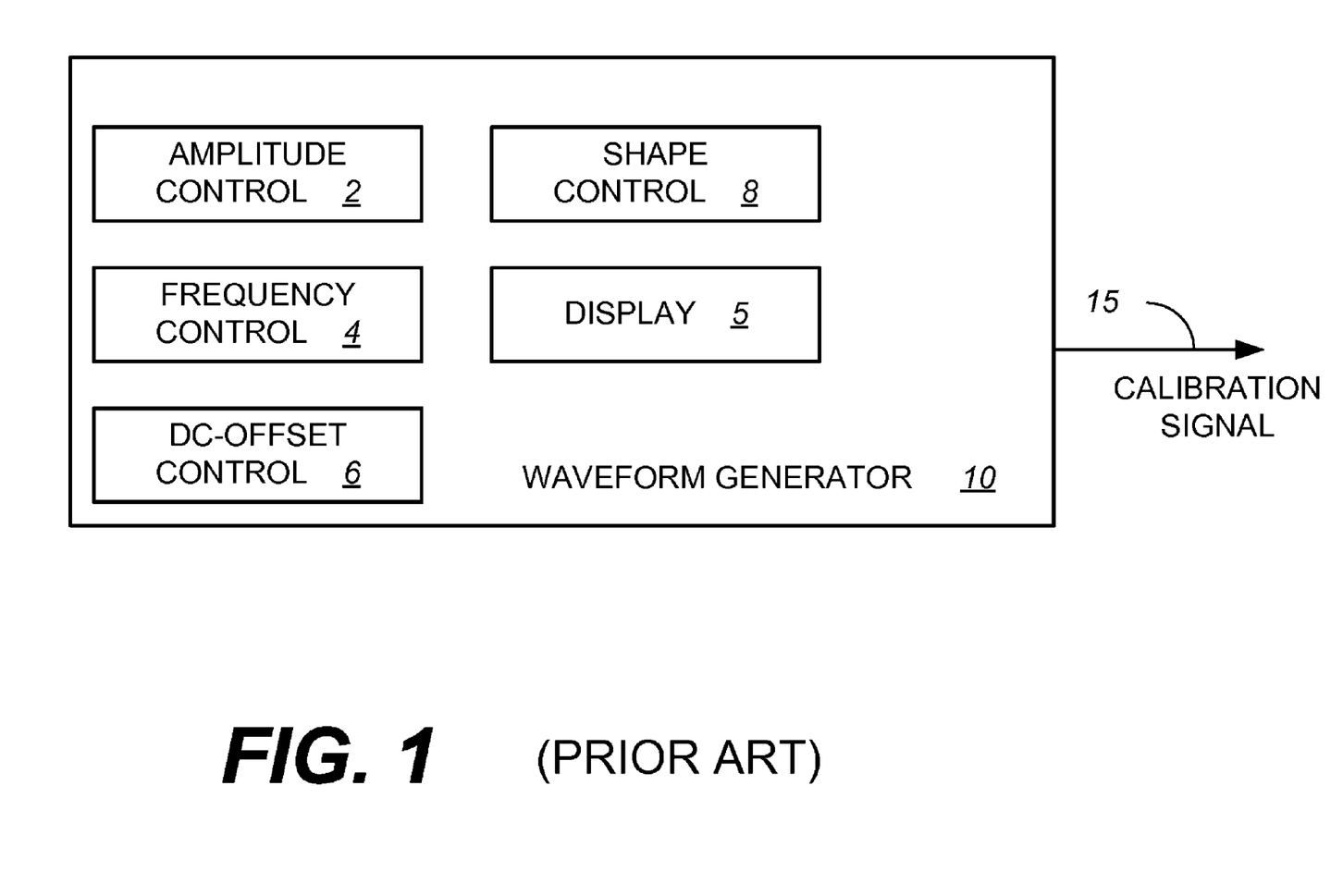
FIG. 1 is a simplified functional block diagram of a prior art waveform generator.

FIG. 1 illustrates an example waveform generator 10 that generates a calibration signal with known DC and AC values or a known relationship between the DC and AC components of the generated calibration signal. As shown in FIG. 1, the waveform generator 10 receives peak-to-peak amplitude information at amplitude control 2, frequency information at frequency control 4, and DC-offset information at DC-offset control 6. The waveform generator 10 further receives shape information at shape control 8. The amplitude control 2 adjusts the magnitude of a generated signal. The frequency control 4 adjusts the frequency of the generated signal. The DC-offset control shifts the generated signal in a desired magnitude from a reference level. The shape control 8 adjusts the magnitude of the generated signal over time. In response to the amplitude control 2, the frequency control 4, the DC-offset control 6 and the shape control 8, the waveform generator 10 generates and provides a calibration signal at output 15 and renders a representation of the calibration signal on display 5. As indicated, the calibration signal should reflect accurately desired waveform characteristics for calibrating a test instrument.

The development of increasingly faster optical data transmission rates has generated a corresponding increase in the difficulty of accurately generating a calibration signal with desired characteristics. It is difficult and prohibitively expensive to generate a precise calibration signal with known DC and AC values or known relationships between DC and AC values because of distortion of the calibration signal at these higher operational frequencies and due to measurement error. Significant errors can be induced by measurement inaccuracies when generating such a prior art calibration signal. Additional errors can be introduced when measuring and processing the information in test equipment. Some of these additional errors are introduced through statistical processing of the acquired data and scaling of the received calibration signal to reduce inaccuracies introduced by the oscilloscope's analog-to-digital converter and other processing circuits.

Therefore, it would be desirable to provide an economical and reliable calibration solution that can be applied across a range of test instruments.

SUMMARY

An embodiment of a system generates a set of signals for determining an AC/DC cross-calibration coefficient. The system includes first and second signal shapers, an AC measurement element, a DC measurement element and a processor. The first signal shaper generates a first output signal having a first asymmetry that is responsive to a periodic input signal. The second signal shaper generates a second output signal having a second asymmetry. The second asymmetry is different from the first asymmetry. The first and second output signals have approximately the same peak-to-peak amplitude. The AC measurement element acquires a first scaled representation of the shape of the first output signal and a second scaled representation of the shape of the second output signal. The DC measurement element receives the first output signal and generates a first average value for the first output signal. The DC element also receives the second output signal and generates a second average value for the second output signal. The processor calculates a first factor responsive to the shape of the first output signal and a second factor responsive to the shape of the second output signal. The processor then applies the first and second average values and the first and second factors in a function that computes the AC/DC cross-calibration coefficient.

An embodiment of a method for determining an AC/DC cross-calibration coefficient comprises the steps of applying a first asymmetric and periodic input signal having a first asymmetry to a common input of an AC measuring element and a DC measuring element, capturing the shape of the first asymmetric and periodic input signal, determining an average value of the first asymmetric and periodic input signal, determining a first factor responsive to the asymmetry of the first asymmetric and periodic input signal input signal, applying a second asymmetric and periodic input signal having a second asymmetry that is different from the first asymmetry to a common input of an AC measuring element and a DC measuring element, capturing the shape of the second asymmetric and periodic input signal, determining an average value of the second asymmetric and periodic input signal, determining a second factor responsive to the asymmetry of the first asymmetric and periodic input signal input signal and calculating an AC/DC cross-calibration as a function of the first and second average values and the first and second factors.

The figures and detailed description that follow are not exhaustive. The disclosed embodiments are illustrated and described to enable one of ordinary skill to make and use the systems and methods for determining an AC/DC cross-calibration coefficient. Other embodiments, features and advantages of the systems and methods will be or will become apparent to those skilled in the art upon examination of the following figures and detailed description. All such additional embodiments, features and advantages are within the scope of the assemblies and methods as defined in the accompanying claims.

BRIEF DESCRIPTION OF THE FIGURES

The systems and methods for determining an AC/DC cross-calibration coefficient can be better understood with reference to the following figures. The components within the figures are not necessarily to scale, emphasis instead being placed upon clearly illustrating the principles of providing a set of calibration signals each with a known asymmetry in the AC component to generate an AC/DC cross-calibration coefficient. Moreover, in the figures, like reference numerals designate corresponding parts throughout the different views.

DETAILED DESCRIPTION

Although described with particular reference to an embodiment of a calibration system, the systems and methods for determining an AC/DC cross-calibration coefficient can be implemented in any test device or data acquisition system where it is desirable to understand the response of elements within the device under calibration to both AC and DC coupled signals.

More specifically, the systems and methods for determining an AC/DC cross-calibration coefficient are suitable for determining the response of an independent DC signal measuring element and an independent AC signal measuring element that share a common input. The AC signal measuring element captures or otherwise acquires a representation of the shape of the AC or time-varying component of a received signal. The DC signal measuring element performs a measurement of the average value of the received signal. It has been discovered that a set of asymmetrical signals where each member signal has a different asymmetry but the same peak-to-peak amplitude can be exploited to economically establish a relationship between a difference of the respective average values (the DC measure) and a scaled representation of the peak-to-peak amplitude of the signals (the AC measure). The set of asymmetrical signals need not be produced with high precision as required by conventional calibration systems. The relationship between the difference of the DC measures and the AC measure defines an AC/DC cross-calibration coefficient. The AC/DC cross-calibration coefficient is a ratio of a first measure or value having a first unit of measure and a second measure or value having a second unit of measure. For example, the first measure (e.g., a DC measure or parameter) may be a voltage in milliVolts or a power in milliWatts and the second measure or parameter (e.g. an AC measure) may be a peak-to-peak amplitude in centimeters (cm) where 1 cm=Xvolts. The AC/DC cross-calibration coefficient defined by the ratio of the first and second measures enables the response of the AC and DC measurement elements to be characterized or converted to the same measurement unit.

The calibration system can be a standalone device or can be integrated in a test instrument. When integrated in a test instrument, the calibration system may be operated under the control of software or various combinations of software and hardware. When implemented in hardware, a processor within the calibration system or test instrument can be implemented on a single integrated circuit (e.g., an application specific integrated circuit) or using separate hardware elements and logic. Calibration software can be executed to control the application of a set of calibration signals for performing an AC/DC cross-calibration. The calibration software includes logic for determining first and second factors related to the shapes of respective AC-coupled input signals. The calibration software further includes logic for determining an AC/DC cross-calibration coefficient as a function of the difference of DC measurements, the difference of the first and second factors and the peak-to-peak voltage of the AC-coupled input signals.

The calibration logic or software comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

Figure 2:
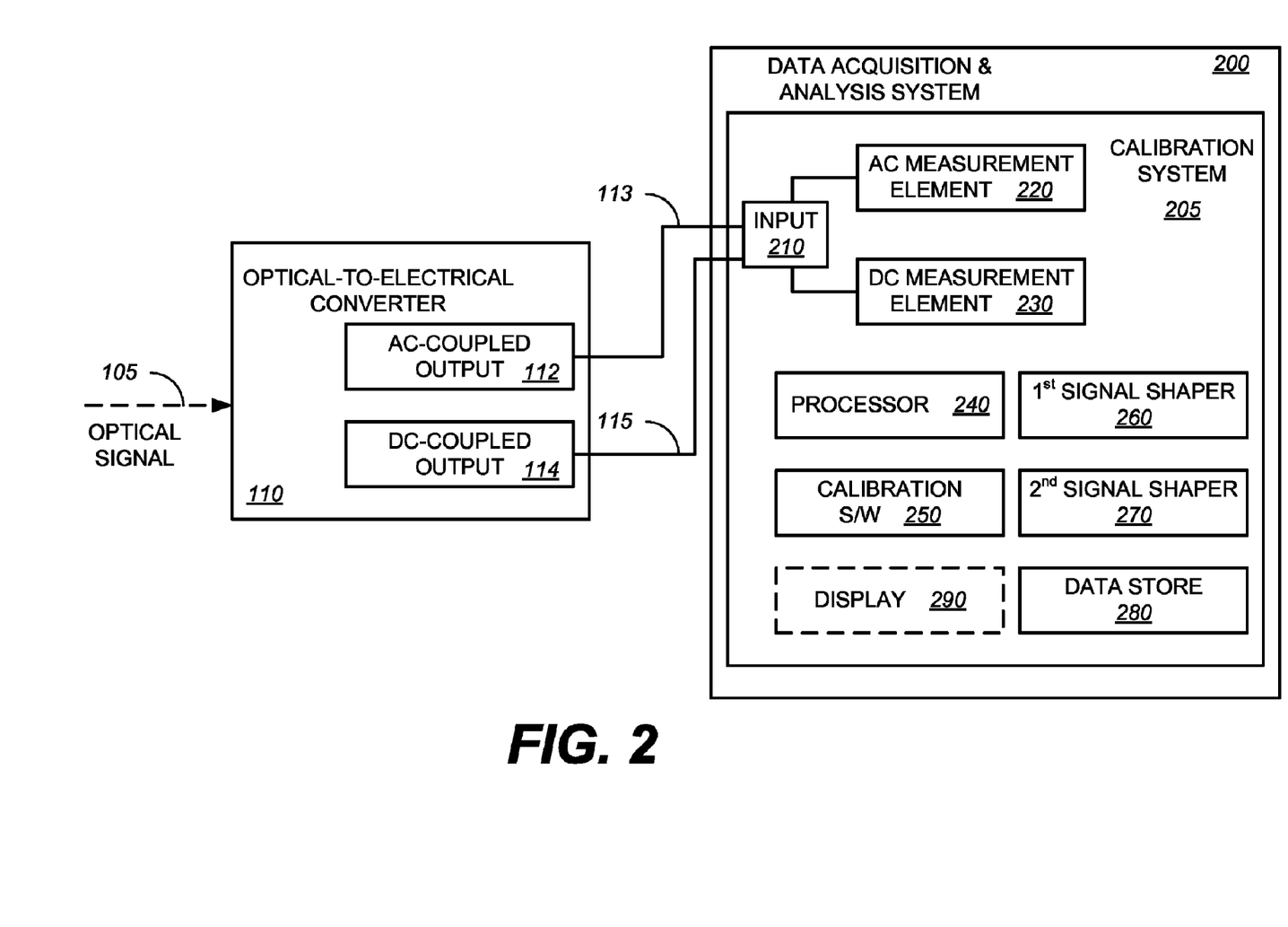
FIG. 2 is a functional block diagram of an embodiment of a calibration environment.

Turning now to the drawings, wherein like reference numerals designate corresponding parts throughout the drawings, reference is made to FIG. 2, which is a block diagram of an example calibration environment. The calibration environment includes an optical-to-electrical converter 110 (OEC) and a data acquisition and analysis system 200 (DAAS). The OEC 110 receives an optical signal via an optical transmission channel 105. The received optical signal is converted to an electrical signal by a light sensitive diode (not shown). The electrical signal is processed by a transimpedance amplifier (not shown) and connected to an AC-coupled output 112 and a DC-coupled output 114. The AC-coupled output 112 communicates an AC signal via connection 113 to the DAAS 200. Similarly, the DC-coupled output 114 communicates a DC signal via connection 115 to the DAAS 200.

The DAAS 200 includes a calibration system 205. The calibration system 205 performs an AC/DC cross-calibration that generates an AC/DC cross-calibration coefficient that can be applied by the DAAS 200 to normalize independent measurements made by the AC measurement element 220 and the DC measurement element 230. In the illustrated embodiment, the calibration system 205 includes the common input 210, the AC measurement element 220 and the DC measurement element 230. Alternatively, any one or all of the common input 210, the AC measurement element 220 and the DC measurement element 230 may be part of a separate test instrument that is communicatively coupled to the calibration system 205.

Both the AC measurement element 220 and the DC measurement element 230 are coupled to the OEC 110 via a common input 210. The common input 210 receives the AC signal on connection 113 and the DC signal on connection 115. The AC signal is further connected to the AC measurement element 220. The AC measurement element 220 tracks the shape of the electrical signal. The AC measurement element 220 generates a scaled version of the AC signal that can be forwarded to an optional display 290 for observation or forwarded to a data store 280 for later observation or analysis. The DC measurement element 230 provides a measure of the power on the electrical signal or an average value of the electrical signal. The power or average value provided by the DC measurement element 230 can be forwarded to the optional display 290 for observation or forwarded to the data store 280 for later observation or analysis.

The calibration system 205 further includes a processor 240, calibration software 250, a first signal shaper 260 and a second signal shaper 270. The processor 240 is a hardware device for executing instructions, such as those in calibration software 250 and manipulating data received from the AC measurement element 220 and the DC measurement element 230. The processor 240, operating in accordance with the executable instructions in calibration software 250, forwards appropriate data signals to the first signal shaper 260 and the second signal shaper 270 to generate a set of calibration signals. As described above, the first signal shaper 260, operating under the direction of the processor 240 and calibration software 250, generates a first calibration signal having a first asymmetry. The second signal shaper 270, operating under the direction of the processor 240 and the calibration software 250, generates a second calibration signal having a second asymmetry. The first asymmetry is different from the second asymmetry. The first and second calibration signals form a set of calibration signals. As will be explained in greater detail in association with the plots of FIGS. 3A and 3B, the respective asymmetries of the first and second calibration signals are exploited to determine the AC/DC cross-calibration coefficient.

The first calibration signal is associated with a first factor that is a function of the shape and peak-to-peak amplitude of an input signal. The second calibration signal is associated with a second factor that is a function of the shape and peak-to-peak amplitude of the input signal. The first factor and the second factor can be calculated by the calibration software 250 and stored in the data store 280. In the illustrated embodiment, the input signal is introduced by the OEC 110. In alternative embodiments, the input signal can be generated within the DAAS 200 or in devices external to the DAAS 200 (not shown). In these alternative embodiments, the first factor and second factor may be calculated and pre-stored in the data store 280. Alternatively, the calibration system 205 may be configured to calculate the first factor and the second factor from an observed shape of the respective calibration signals.

Storage devices suitable for tangibly embodying the calibration software 250 in the calibration system 205 or an alternative test instrument include all forms of non-volatile memory, including, for example, semiconductor memory devices, such as an erasable programmable read-only memory (EPROM), an electrically erasable programmable read-only memory (EEPROM), and flash memory devices. Storage devices for tangibly embodying the data store 280 including the above-described first average value, second average value, first factor, second factor, peak-to-peak amplitudes, and the AC/DC cross-calibration coefficient include all forms of volatile memory, including, for example, semiconductor memory devices, such as random access memory (RAM) device and dynamic RAM (DRAM) devices.

The processor 240 is not limited to any particular hardware or firmware. The processor 240 may be implemented in any computing or data processing environment, including in digital electronic circuitry (e.g., an application-specific integrated circuit, such as a digital signal processor (DSP)) or in computer hardware, firmware, or software.

When implemented in hardware, the processor 240 can be implemented in any or a combination of the following technologies, which are all well known in the art: discrete electronic components, discrete logic circuit(s) having logic gates for implementing logic functions upon data signals, an application specific integrated circuit having appropriate logic gates, a programmable gate array(s) (PGA), a field programmable gate array (FPGA), etc.

Figure 3A:
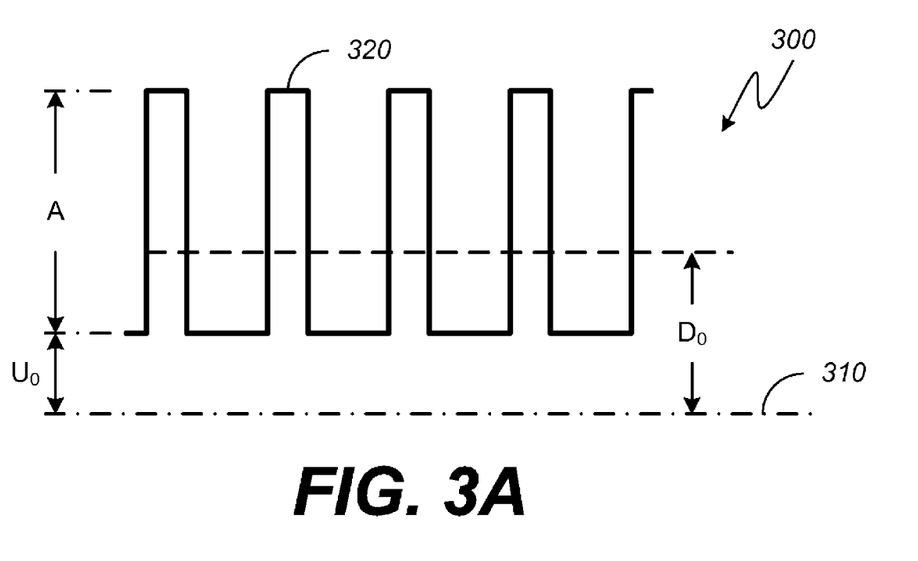
FIGS. 3A and 3B are plots of an example set of calibration signals with known asymmetry.
Figure 3B:
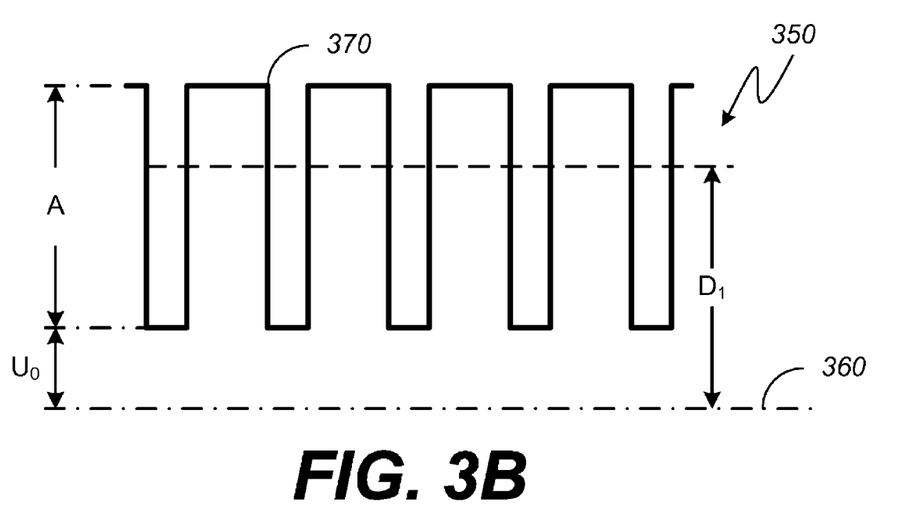

FIGS. 3A and 3B are plots of an example set of calibration signals with known asymmetries. FIG. 3A includes a plot 300 of a signal trace 320 that varies in amplitude periodically over time. The signal trace 320 is an example embodiment of a first calibration signal of a set of calibration signals having different asymmetries. The signal trace 320 is characterized by a peak-to-peak amplitude A, a DC-offset $U_0$, and an average value represented by $D_0$. The peak-to-peak amplitude A defines the difference in amplitude from the maximum level of the signal trace 320 to the minimum level of the signal trace 320. The DC-offset $U_0$ defines the shift or separation in distance of the minimum level of the signal trace 320 with respect to a reference 310. The average value $D_0$ is a representation of a DC measurement result or the total energy below the signal trace 320 and above the reference 310 over time. The signal trace 320 is asymmetrical and has a 1:2 asymmetry. That is, the signal trace 320 is at its maximum level for one unit of time and at its minimum level for two units of time during each period of the first calibration signal. The first calibration signal is further characterized by a first factor of ⅓. That is, the first calibration signal is at its maximum level for ⅓ of each period.

The DC measurement result or average value $D_0$ of the first calibration signal represented by the signal trace 320 has a known relation (i.e., the first factor or $k_0$) to the peak-to-peak amplitude A with an unknown DC-offset $U_0$. The first calibration signal can be represented by the following equation:

$$D_0 = U_0 + k_0 A \qquad \text{Eq.1}$$

FIG. 3B includes a plot 350 of a signal trace 370 that varies in amplitude periodically over time. The signal trace 370 is an example embodiment of a second calibration signal of the set of calibration signals having different asymmetries. The signal trace 370 is characterized by a peak-to-peak amplitude A, a DC-offset $U_0$, and an average value represented by $D_1$. The peak-to-peak amplitude A defines the difference in amplitude from the maximum level of the signal trace 370 to the minimum level of the signal trace 370. The DC-offset $U_0$ defines the shift or separation in distance of the minimum level of the signal trace 370 with respect to the reference 360. The average value $D_1$ is a representation of the total energy below the signal trace 370 and above the reference 360 over time. The signal trace 370 is asymmetrical and has a 2:1 asymmetry. That is, the signal trace 370 is at its maximum level for two units of time and at its minimum level for one unit of time during each period of the second calibration signal. The second calibration signal is further characterized by a second factor of ⅔. That is, the second calibration signal is at its maximum level for ⅔ of each period. In this example, the second calibration signal is an inverse of the first calibration signal.

The DC measurement result or average value $D_1$ of the second calibration signal represented by the signal trace 370 has a known relation (i.e., the second factor or $k_1$) to the peak-to-peak amplitude A with an unknown DC-offset $U_0$. The second calibration signal can be represented by the following equation:

$$D_1 = U_0 + k_1 A \qquad \text{Eq.2}$$

A combination of the relationships described by equation 1 and equation 2 leads to the following equation, which is a representation of the AC/DC cross-calibration coefficient:

$$D_1 - D_0 = (U_0 + k_1 A) - (U_1 + k_0 A) = (k_1 - k_0) A \qquad \text{Eq. 3}$$

In this way, the AC/DC cross-calibration coefficient defines a relationship between the difference of DC-coupled signal measurements and the AC amplitude A. The first factor $k_0$ and the second factor $k_1$ need not be known prior to the calibration process. The first and second factors can be calculated from AC captured waveforms such as from an electrical signal from the OEC 110 (FIG. 2).

Figure 4:
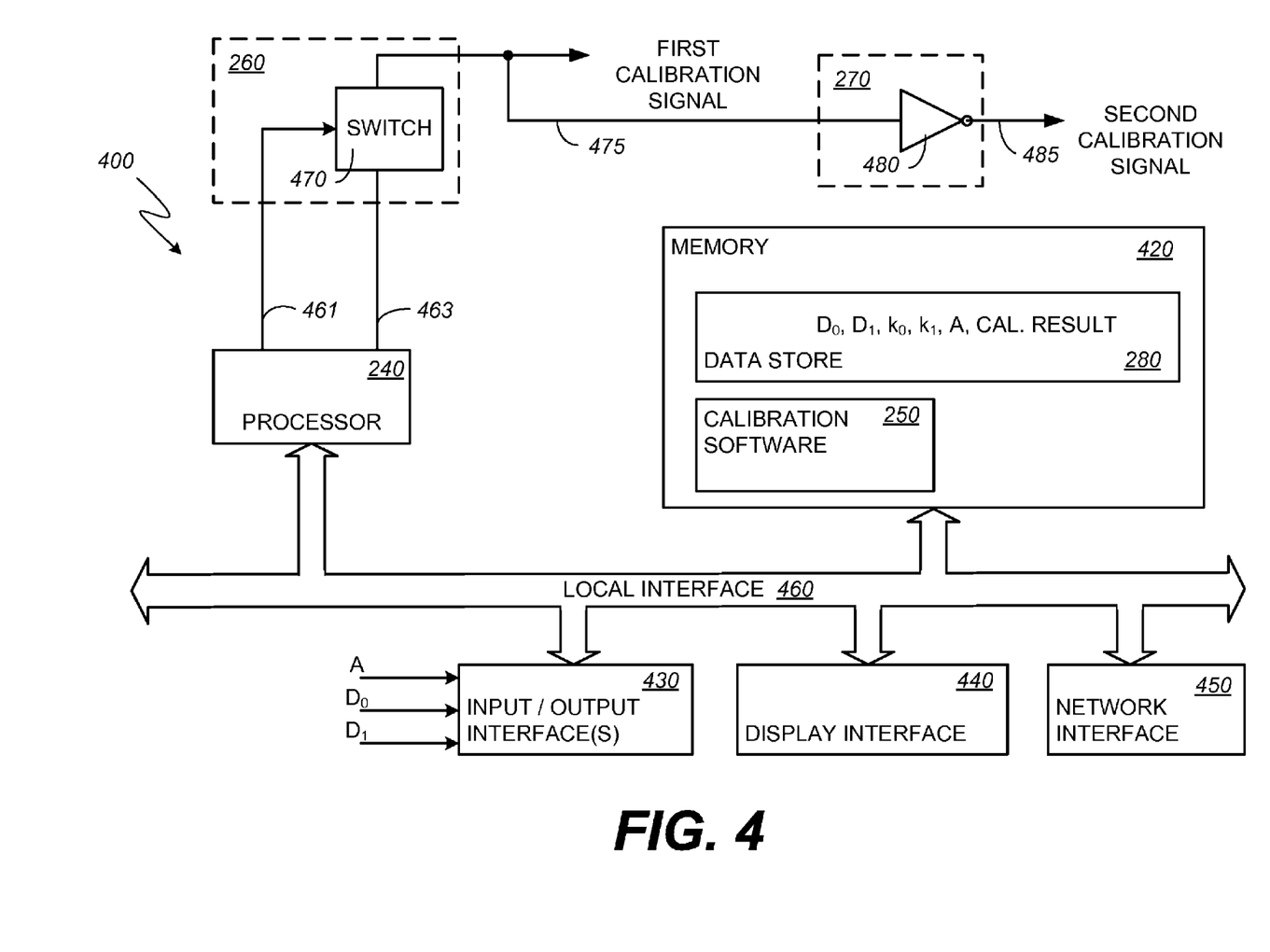
FIG. 4 is a functional block diagram of the calibration system of FIG. 2.

FIG. 4 is a functional block diagram of the calibration system 205 introduced in FIG. 2. The calibration system 205 includes the processor 240, a memory 420, input/output (I/O) interface(s) 430, a display interface 440 and an optional network interface 450 communicatively coupled to one another via the local interface 460. The local interface 460 can be, for example but not limited to, one or more buses or other wired or wireless connections, as is known in the art. The local interface 460 may have additional elements, which are omitted for simplicity, such as controllers, buffers (caches), drivers, repeaters, and receivers, to enable communications. In addition, the local interface 460 may include address, control, power and/or data connections to enable appropriate communications among the aforementioned components.

The processor 240 executes software (i.e., programs or sets of executable instructions), particularly the calibration software 250 stored in the memory 420. The processor 240 can be any custom made or commercially available processor, a central processing unit (CPU), an auxiliary processor among several processors associated with the calibration system 205, a semiconductor based microprocessor (in the form of a microchip or chip set), or generally any device for executing instructions.

The processor 240 provides a periodic series of logic values via connection 461 to a data input of the first signal shaper 260. The processor 240 further provides a clock or other periodic signal having a desired frequency via connection 463 to the first signal shaper 260. The first signal shaper 260 applies the series of logic values on connection 461 and the clock signal on connection 463 to switch 470, which generates the first calibration signal on connection 475.

As further illustrated in FIG. 4, the first calibration signal is forwarded via connection 475 to the second signal shaper 270. The second signal shaper 270 includes an inverter 480, which produces the second calibration signal on connection 485. As described above, the first and second calibration signals are forwarded to the common input 210 of the DAAS 200 to produce the first and second average values (i.e., $D_0$, $D_1$) and the peak-to-peak amplitude A. The calibration software 250 determines the proper first and second factors (i.e., $k_0$, $k_1$) based on the shape of the output signal trace supplied by the AC measurement device 220. The calibration software 250 applies the above DC values, peak-to-peak amplitude and factors $k_0$, $k_1$ to determine the AC/DC cross-calibration coefficient.

The memory 420 can include any one or combination of volatile memory elements (e.g., random-access memory (RAM), such as dynamic random-access memory (DRAM), static random-access memory (SRAM), synchronous dynamic random-access memory (SDRAM), etc.) and non-volatile memory elements (e.g., read-only memory (ROM), hard drive, tape, compact disk read-only memory (CD-ROM), etc.). Moreover, the memory 420 may incorporate electronic, magnetic, optical, and/or other types of storage media. Note that the memory 420 can have a distributed architecture, where various components are situated remote from one another, but can be accessed by the processor 240.

The software in memory 420 may include one or more separate programs, each of which comprises an ordered listing of executable instructions for implementing logical functions. In the example embodiment illustrated in FIG. 4, the software in the memory 420 includes the calibration software 250. The memory 420 also includes data store 280, which includes capacity for storing the DC average values $D_0$, $D_1$, the first and second factors $k_0$, $k_1$, as well as the peak-to-peak amplitude A and an AC/DC cross-calibration coefficient or calibration result.

The I/O interface(s) 430 includes multiple mechanisms configured to transmit and receive information via the calibration system 205. These mechanisms support human-to-machine and machine-to-human information transfers. Such human-to-machine interfaces may include touch sensitive displays, pushbuttons or the combination of a graphical-user interface and a controllable pointing device such as a mouse. In addition, the I/O interface(s) 430 include mechanisms configured to receive representations of the peak-to-peak amplitude A, as well as the first average value $D_0$ and the second average value $D_1$ from the AC measurement element 220 and the DC measurement element 230.

The display interface 440 is a hardware device that is responsible for producing graphical abstractions in accordance with one or more programs and data. The display interface 440 receives instructions and data from the processor 240 and memory 420 and generates one or more output signals suitable for directing the presentation of information via a designated output device. The display interface 440 enables the calibration system 205 to render information on an integrated display or via various network-coupled display devices such as printers, plotters, monitors, etc.

The optional network interface 450 enables the calibration system 205 to communicate with various network-coupled devices. The network interface 450 performs a variety of functions including, for example the signal conditioning and format conversions to communicate data via one or more wired or wireless network communication protocols.

When the calibration system 205 is in operation, the processor 240 is configured to execute the calibration software 250 stored within the memory 420, to communicate data to and from the memory 420, and to control operations of the calibration system 205 pursuant to the calibration software 250. The calibration software 250, in whole or in part, but typically the latter, is read by the processor 240, buffered within the processor 240, and then executed.

Figure 5:
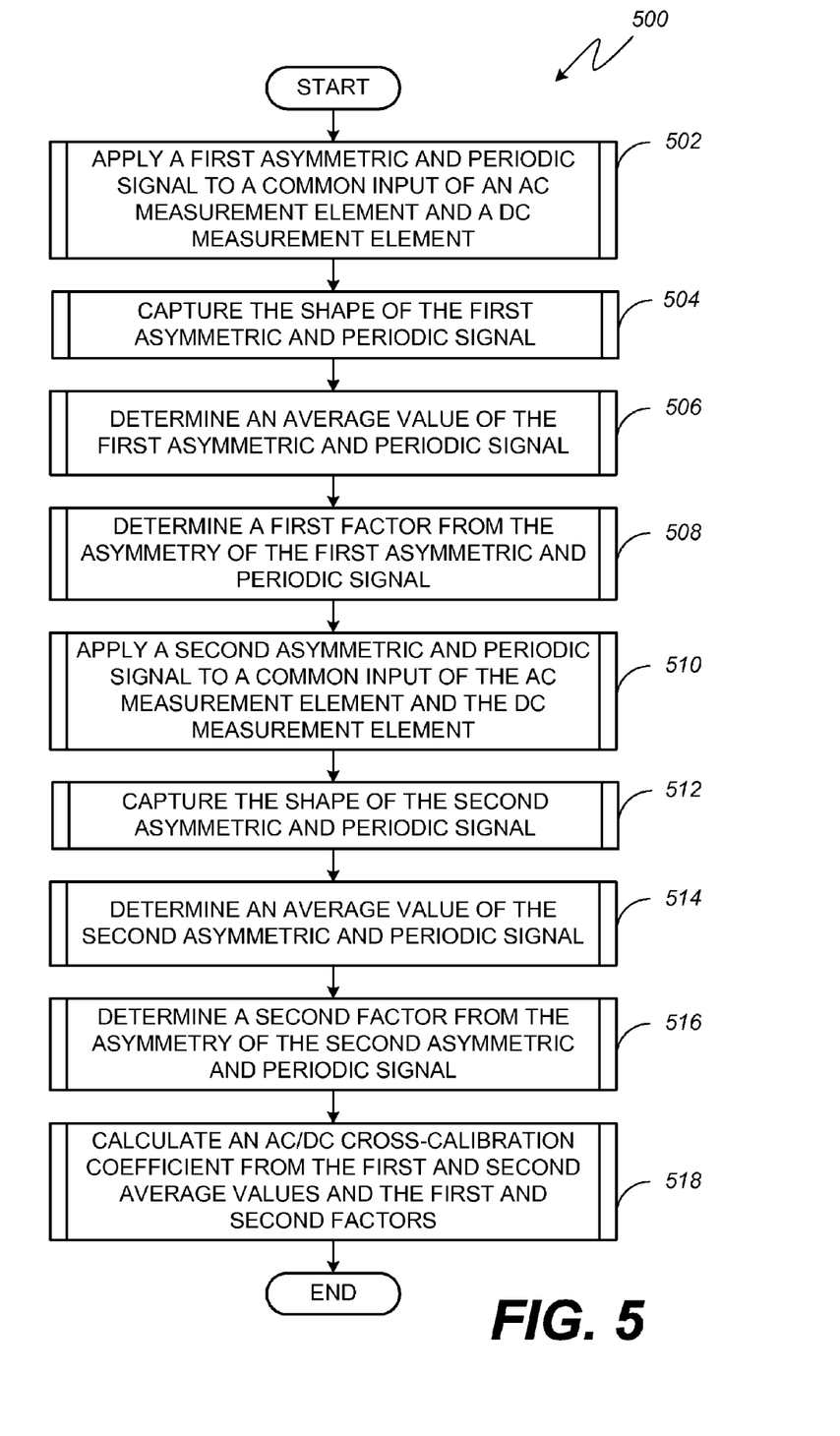
FIG. 5 is a flow chart illustrating an embodiment of a method for determining an AC/DC cross-calibration coefficient.

FIG. 5 is a flow chart illustrating an embodiment of a method for determining an AC/DC cross-calibration coefficient using a set of asymmetric calibration signals. The flow diagram of FIG. 5 shows the architecture, functionality, and operation of a possible implementation via software and circuit elements. In this regard, each block represents a module, segment, or portion of code, which comprises one or more executable instructions for implementing the specified function(s). When a function is implemented via hardware, one or more blocks in the flow diagram may represent a circuit or circuits.

Method 500 begins with block 502 where a first asymmetric and periodic signal is applied to a common input of an AC measurement element and a DC measurement element. In block 504, the shape of the first asymmetric and periodic signal is captured. As described above, the shape of the first asymmetric and periodic signal can be captured or acquired with the AC measurement element or via other circuitry designed for tracking a signal at the operational frequency of an optical communication system of interest. In block 506, an average value of the first asymmetric and periodic signal is determined. An average value can be retrieved from the DC measurement element. In block 508, a first factor is determined. The first factor is a function of the asymmetry or shape of the first asymmetric and periodic signal.

In block 510, a second asymmetric and periodic signal is applied to a common input of the AC measurement element and the DC measurement element. In block 512, the shape of the second asymmetric and periodic signal is captured. The shape of the second asymmetric and periodic signal can be captured or acquired with the AC measurement element or via other circuitry designed for tracking a signal at the operational frequency of an optical communication system of interest. In block 514, an average value of the second asymmetric and periodic signal is determined. An average value can be retrieved from the DC measurement element. In block 516, a second factor is determined. The second factor is a function of the asymmetry or shape of the second asymmetric and periodic signal. Thereafter, as indicated in block 518, an AC/DC cross-calibration coefficient is calculated from the first and second average values and the first and second factors. As described above, the AC/DC cross-calibration coefficient as defined by the ratio of the first and second average values to the first and second factors enables the response of the AC and DC measurement elements to be characterized or converted to the same measurement unit.

While various embodiments of the systems and methods for determining an AC/DC cross-calibration coefficient have been described, it will be apparent to those of ordinary skill in the art that many more embodiments and implementations are possible that are within the scope of this disclosure. Accordingly, the described systems and methods are not to be restricted or otherwise limited except in light of the attached claims and their equivalents.

What is claimed is:

1. A method for determining an AC/DC cross-calibration coefficient, the method comprising:
   applying a first asymmetric and periodic input signal having a first asymmetry to a common input of an AC measurement element and a DC measurement element;
   capturing the shape of the first asymmetric and periodic input signal;
   determining an average value of the first asymmetric and periodic input signal;
   determining a first factor responsive to the asymmetry of the first asymmetric and periodic input signal;
   applying a second asymmetric and periodic input signal having a second asymmetry that is different from the first asymmetry to a common input of an AC measuring element and a DC measuring element;
   capturing the shape of the second asymmetric and periodic input signal;
   determining an average value of the second asymmetric and periodic input signal;
   determining a second factor responsive to the asymmetry of the second asymmetric and periodic input signal; and
   calculating an AC/DC cross-calibration as a function of the first and second average values and the first and second factors.

2. The method of claim 1, wherein applying a second asymmetric and periodic input signal having a second asymmetry that is different from the first asymmetry comprises inverting the first asymmetric and periodic input signal.

3. The method of claim 1, wherein applying a first asymmetric and periodic input signal having a first asymmetry and applying a second asymmetric and periodic input signal having a second asymmetry comprises approximately the same peak-to-peak amplitude in the respective asymmetric and periodic input signals.

4. The method of claim 1, wherein capturing the shape of the first asymmetric and periodic input signal and capturing the shape of the second asymmetric and periodic input signal is accomplished by using the AC measuring element.

5. The method of claim 4, wherein using the AC measuring element results in a scaled representation of each of the first asymmetric and periodic input signal and the second asymmetric and periodic input signal.

6. The method of claim 1, wherein calculating an AC/DC cross-calibration as a function of the first and second average values comprises a difference operation.

7. The method of claim 6, wherein calculating an AC/DC cross-calibration as a function of the first and second average values generates a first result having a first unit of measure.

8. The method of claim 1, wherein calculating an AC/DC cross-calibration as a function of the first factor and the second factor comprises a difference operation.

9. The method of claim 8, wherein calculating an AC/DC cross-calibration as a function of the first factor and the second factor generates a second result having a second unit of measure.

10. A system for generating a set of signals used in determining an AC/DC cross-calibration coefficient, the system comprising:
    a first signal shaper configured to generate a first signal having a first asymmetry, the signal responsive to a periodic input signal;
    a second signal shaper configured to generate a second signal having a second asymmetry, the second asymmetry different from the first asymmetry, wherein the first and second signals have approximately the same peak-to-peak amplitude;

an AC measurement element configured to acquire a first scaled representation of the shape of the first signal and a second scaled representation of the shape of the second signal;

a DC measurement element configured to receive the first signal and the second signal and generate a first value responsive to the first signal and a second value responsive to the second signal; and a processor configured to calculate a first factor responsive to the shape of the first signal and a second factor responsive to the shape of the second signal, wherein the processor applies the first factor and the second factor and the first and second values in a function that computes the AC/DC cross-calibration coefficient.

11. The system of claim 10, wherein the first signal shaper acquires the periodic input signal from an optical to electrical converter.

12. The system of claim 10, wherein the first signal shaper comprises a switch coupled to a control signal that applies a repeating sequence of logic levels.

13. The system of claim 12, wherein the repeating sequence generates a 2:1 asymmetry.

14. The system of claim 13, wherein the second signal shaper is an inverter that generates a 1:2 asymmetry.

15. The system of claim 10, wherein the function comprises a difference of the first value and the second value.

16. The system of claim 15, wherein the difference of the first value and the second value generates a first result having a first unit of measure.

17. The system of claim 10, wherein the function comprises a difference of the first factor and the second factor.

18. The system of claim 17, wherein the product of the difference of the first factor and the second factor and the peak-to-peak amplitude of the first and second scaled representations generates a second result having a second unit of measure.

* * * * *